Patented July 7, 1936

2,046,823

UNITED STATES PATENT OFFICE 2,046,823

PRODUCTION OF COMPOSITE PIGMENTS

Gunnard E. Johnson, Hammond, Ind., and Thomas H. Donahue, Tucson, Ariz., assignors to Anaconda Lead Products Company, a corporation of Delaware No Drawing. Application October 15, 1935, Serial No. 45,100

11 Claims. (Cl. 134—58)

This invention relates to pigments and has for an object the production of improved composite pigments and an improved method of producing composite pigments. More particularly, the invention contemplates the production of improved composite pigments containing titanium and an improved method of producing such pigments. The invention further contemplates the production of improved paint products comprising improved pigments containing titanium. A further specific object of the invention is to produce improved composite pigments comprising basic lead carbonate (white lead) and one or more insoluble titanium compounds.

The present invention is based on our discovery that an improved composite titanium-bearing pigment may be produced by chemically precipitating a water-insoluble titanium compound from an aqueous solution of a water-soluble titanium compound in the presence of a water-insoluble pigment which functions as a component or as a constituent of the resulting composite pigment. We have also discovered that the properties of basic carbonate white lead pigments may be improved by precipitating insoluble titanium compounds from aqueous solutions of water-soluble titanium compounds containing the basic carbonate white lead pigments in suspension therein.

In carrying out a method of the invention, precipitation of the water-insoluble titanium compound from the aqueous solution of the water-soluble titanium compound may be effected by the water-insoluble pigment which ultimately forms a part of the titanium-bearing composite pigment, or by means of an extraneous precipitating agent. Also, composite pigments of the invention may be produced by co-precipitation of the water-insoluble titanium compound and one or more other water-insoluble compounds suitable for incorporation in the composite pigment. For example, in producing a composite pigment comprising lead and titanium, (1) A water-soluble titanium compound in aqueous solution may be subjected to the action of a basic white lead pigment such, for example, as basic lead carbonate to effect a reaction between the water-soluble titanium compound and the basic lead carbonate with the production of a water-insoluble composite pigment comprising lead and titanium, or (2) A suspension of a basic white lead pigment such as basic lead carbonate in an aqueous solution of a water-soluble titanium compound may be subjected to the action of an agent such, for example, as a carbonate, bicarbonate or hydroxide of an alkali metal or ammonium, which is capable of reacting with the water-soluble titanium compound in aqueous solution to produce a water-insoluble titanium compound capable of functioning in conjunction with the basic lead carbonate to produce a composite pigment, or (3) An aqueous solution containing a water-soluble lead compound and a water-soluble titanium compound may be subjected to the action of an agent such, for example, as sodium carbonate which is capable of reacting with the lead salt in aqueous solution to produce basic lead carbonate and capable of reacting with the water-soluble titanium compound in aqueous solution to produce a water-insoluble titanium compound.

The various procedures comprising the method of the invention may be carried out at any suitable temperature at which the water employed as the solvent is in a liquid state. Solutions of any suitable degrees of concentration may be employed. Ordinarily, the use of solutions at room temperature (about 70° F.) produces good results, but the temperature may be varied to increase or decrease solubilities or to increase or decrease speeds of reaction.

In forming the composite pigments of the invention such, for example, as those comprising basic lead carbonate and a water-insoluble titanium compound when pre-formed basic lead carbonate is employed, the suspension of basic lead carbonate in an aqueous solution of a water-soluble titanium compound may be formed in any suitable manner. Thus, for example, a suspension of basic lead carbonate in water may be formed and the water-soluble titanium compound may be added thereto in the form of an aqueous solution or in the form of a dry salt or compound, or dry, finely divided basic lead carbonate may be added to and dispersed in an aqueous solution of the water-soluble titanium compound. Basic carbonate white lead of any suitable commercial type may be employed, but we prefer to employ commercial pigment white lead produced electrolytically.

When the water-soluble titanium compound employed is only slightly soluble in water or when it decomposes readily in water solution, we prefer to add it as a dry salt or compound to an aqueous suspension of the basic lead carbonate. Thus, for example, in employing a slightly water soluble fluorotitanate such as sodium fluorotitanate ($Na_2TiF_6$), we prefer to add the dry salt to an aqueous suspension of basic lead carbonate. The dissolved portion of the sodium fluorotitanate reacts with the basic lead carbonate making possible the dissolution of additional quantities. Thus, dissolution of the sodium fluorotitanate and reaction of the dissolved salt with the basic lead carbonate proceed continuously until all of the sodium fluorotitanate is dissolved and all of the dissolved salt has reacted with the basic lead carbonate, provided, of course, that the basic lead carbonate is present in sufficient amount to react with all of the sodium fluorotitanate added to the suspension. In employing stable slightly water-soluble titanium compounds, it is advisable to employ heated solutions to increase the amount of titanium compound dissolved and to increase the speed of reaction.

In forming composite pigments containing basic lead carbonate in titanium in accordance with the invention, the basic lead carbonate and the soluble titanium compounds may be employed in any suitable proportions. Thus, the quantity of water-soluble titanium compound employed may vary from a small amount sufficient to produce only an appreciable improvement in the properties of the basic lead carbonate (white lead) to quantities above which either no further appreciable improvement in the properties of the white lead is obtained or any additional water-soluble titanium compound added is only slowly or incompletely consumed. Generally, it is advisable to so regulate the quantity of water-soluble titanium compound employed as to give a composite pigment of which the major portion is unaltered basic lead carbonate (white lead), and we have found that the most desirable composite pigments are produced by employing quantities of water-soluble titanium compound equal in weight to about 2 to 10 percent of the weight of the basic lead carbonate (white lead) employed.

Titanium compounds suitable for use in improving the properties of basic carbonate white lead and forming other composite pigments in accordance with the invention include, among others, titanium sulphate, titanium chloride, titanium fluoride, fluorotitanic acid and fluorotitanates of metals such as the alkali metals, alkaline-earth metals, magnesium and zinc.

Aqueous suspensions of basic lead carbonate containing any suitable relative proportions of water and basic lead carbonate may be employed. Suspensions containing water and basic lead carbonate in the proportions by weight of four to one are freely fluent and entirely suitable for the addition thereto of the water-soluble titanium compound either dry or in aqueous solution. Solutions of water-soluble titanium compounds of any suitable concentrations may be employed, but the use of relatively dilute solutions is preferred.

The water-soluble titanium compounds, whether dry or in aqueous solution, may be mixed with the aqueous suspensions of basic lead carbonate in small increments or the complete reaction mixtures may be formed at once. Small increments of both the aqueous suspension of basic lead carbonate and the water-soluble titanium compound may be mixed progressively or gradually until mixing has been completed, or small increments of either the aqueous suspension of basic lead carbonate or the water-soluble titanium compound may be mixed gradually with the entire quantity of the other until mixing has been completed. It is advisable to stir the reaction mixture during the entire mixing period and, after mixing of the reagents has been completed, stirring or agitation of the mixture should be continued until the reaction has been completed and the desired amount of water-insoluble titanium compound has been formed.

When reaction between the basic lead carbonate and the water-soluble titanium compound has been completed or has proceeded to the point at which the desired amount of water-insoluble titanium compound has been formed, the resulting aqueous suspension of composite pigment is treated to separate the composite pigment from the liquid in which it is suspended. Separation of the composite pigment and liquid may be accomplished in any suitable manner, as, for example, by filtration, centrifuging or sedimentation and decantation. The wet, separated pigment is washed with water to remove any water-soluble compounds adhering to the particles thereof, and the washed product is dried at a temperature sufficiently low to prevent thermal decomposition of the white lead (basic lead carbonate) component or constituent. Preferably, the washed product is dried at a temperature not in excess of 140° C., as basic carbonate white lead will become discolored at higher temperatures. The dried composite pigment may be ground or otherwise treated in any suitable manner to produce products suitable for the customary uses of pigments.

The identity of the compound or compounds of titanium precipitated by reaction of basic lead carbonate (white lead) with the water-soluble titanium compounds in aqueous solution has not been ascertained and the nature of the reaction is not fully understood. It is known, however, that the product so obtained is fundamentally different from simple mechanical mixtures of white lead and titanium oxide pigments. Furthermore, the composite pigment so obtained has physical properties which are fundamentally and distinctly different and superior to either titanium oxide or white lead pigments by themselves. The resulting pigment always contains, as compared with its titanium content, a preponderating amount of the basic carbonate white lead. Our investigations have demonstrated that the titanium compound of the solution reacts with the suspended particles of white lead resulting in the precipitation thereon of another titanium compound or a complex titanium-lead compound. The extreme fineness of the individual particles makes it practically impossible to determine precisely the exact condition of aggregation of the components or constituents of the composite pigment. It is known, however, that the resulting pigment still comprises the constituents originally contained in the white lead and, in addition, chemically combined titanium compound or compounds; that it possesses enhanced whiteness, tinting strength, hiding power and other properties as compared with white lead; and that it has, when mixed with linseed oil and used as a paint, all the desirable and valuable properties of pure white lead paint such as proper drying characteristics as well as resistance to chalking on exposure to various types of atmospheres.

Some definite indications of the nature of the combination between the basic carbonate white lead and the titanium compound have been obtained by analyses of the pigment and examination of the residual solution. It is found that the titanium content of the treating solution is substantially completely precipitated and that all or a large proportion of the acid radical of the titanium solution also enters into the pigment combination. For instance, in treating a water suspension of basic carbonate white lead with a solution of titanium tetrachloride (TiCl₄) three of the four chlorine atoms of each titanium tetrachloride molecule enter into the pigment combination. Contrary to what might be expected, all of the chlorine content of the titanium chloride does not appear as soluble lead chloride in the residual solution. There is evidence, therefore, that titanium oxide is not formed, but that a reaction occurs resulting in the formation of basic titanium compounds such as, for example, Ti(OH)Cl₃ or other complex combinations of the titanium salt molecule with the basic lead carbonate molecule. It is possible, and also quite probable, that an insoluble lead compound corresponding to the acid radical of the titanium compound is formed to a greater or less extent.

The pigments produced in accordance with this invention are of brilliant whiteness, can readily be ground into a paint with linseed or other suitable vehicle, and possess unusual hiding and covering power. The high tinting strength is shown by the fact that, when preparing colored paints with composite pigments formed by reaction of basic carbonate white lead with a water-soluble titanium compound, more colored pigment is required to produce the same final color than in the case of ordinary white lead. So far as has been found, such pigments possess all of the desirable and valuable characteristics of white lead, such as drying power and resistance to weathering.

The possession of these characteristics is attributed to the peculiar state of aggregation resulting from the method of formation herein described, since similar or equivalent characteristics can not be produced by simple mechanical mixing of the components white lead and a titanium pigment. The composite pigment combines all of the desirable characteristics of white lead, such as drying power and resistance to weathering, with the desirable properties of titanium pigments such as brilliant whiteness, high hiding power and covering power and tinting strength. The titanium component of the pigment can not be separated from the white lead component by any means other than by chemical separation. The composite pigment does not, like many pigments, contain an inert base of inferior pigment properties. The white lead which may be regarded as the base, is itself an excellent pigment.

We claim:

1. The method of producing a pigment which comprises subjecting an aqueous solution containing a water-soluble lead compound and a water-soluble titanium compound to the action of an agent capable of reacting with the water-soluble lead compound to produce basic lead carbonate and capable of reacting with the water-soluble titanium compound to produce a water-insoluble compound of titanium, thereby to form a water-insoluble composite pigment comprising basic lead carbonate and a titanium compound.

2. The method of producing a pigment which comprises subjecting a water-soluble compound of titanium in aqueous solution to the action of basic lead carbonate to effect a reaction between the basic lead carbonate and the titanium compound with the production of a water-insoluble composite pigment comprising lead and titanium.

3. The method of producing a pigment which comprises subjecting basic lead carbonate in aqueous suspension to the action of a water-soluble titanium compound to effect a reaction between the basic lead carbonate and the titanium compound with the production of a water-insoluble composite pigment comprising lead and titanium.

4. The method of producing a pigment which comprises mixing an aqueous solution of a water-soluble titanium compound with an aqueous suspension of basic lead carbonate to effect a reaction between the basic lead carbonate and the titanium compound with the production of a water-insoluble pigment comprising lead and titanium.

5. The method of producing a pigment which comprises subjecting a water-soluble compound of titanium in aqueous solution to the action of basic lead carbonate to effect a reaction between the basic lead carbonate and the titanium compound with the production of a water-insoluble composite pigment comprising lead and titanium, the amount of water-soluble titanium compound employed being equal to about 2 to 10 percent of the weight of the basic lead carbonate employed.

6. The method of producing a pigment which comprises subjecting titanium fluoride in aqueous solution to the action of basic lead carbonate to effect a reaction between the basic lead carbonate and the titanium fluoride with the production of a water-insoluble composite pigment comprising lead and titanium.

7. The method of producing a pigment which comprises subjecting titanium tetrachloride in aqueous solution to the action of basic lead carbonate to effect a reaction between the basic lead carbonate and the titanium tetrachloride with the production of a water-insoluble composite pigment comprising lead and titanium.

8. The method of producing a pigment which comprises adding a slightly water-soluble titanium compound to an aqueous suspension of basic lead carbonate, and agitating the resulting mixture to effect gradual dissolution of the titanium compound and reaction of the dissolved titanium compound with the basic lead carbonate, thereby to produce a water-insoluble composite pigment comprising lead and titanium.

9. The method of producing a pigment which comprises adding an alkali metal fluorotitanate to an aqueous suspension of basic lead carbonate, and agitating the resulting mixture to effect gradual dissolution of the alkali metal fluorotitanate and reaction of the dissolved alkali metal fluorotitanate with the basic lead carbonate, thereby to produce a water-insoluble composite pigment comprising lead and titanium.

10. A composite pigment comprising basic lead carbonate and a water-insoluble titanium compound formed in situ and deposited upon the surfaces of the basic lead carbonate particles by reaction of the basic lead carbonate with a water-soluble titanium compound in aqueous solution.

11. A paint comprising a suitable vehicle and a composite pigment containing basic lead carbonate and a water-insoluble titanium compound formed in situ and deposited upon the surfaces of the basic lead carbonate particles by reaction of the basic lead carbonate with a water-soluble titanium compound in aqueous solution.

GUNNARD E. JOHNSON.
THOMAS H. DONAHUE.